US012609356B2

(12) United States Patent
Mu et al.

(10) Patent No.: US 12,609,356 B2
(45) Date of Patent: Apr. 21, 2026

(54) ELECTROLYTE SUITABLE FOR LITHIUM-ION BATTERY OF SILICON-CARBON SYSTEM AND LITHIUM-ION BATTERY

(71) Applicant: ZHUHAI COSMX BATTERY CO., LTD., Zhuhai (CN)

(72) Inventors: Yingdi Mu, Zhuhai (CN); Long Wang, Zhuhai (CN); Hai Wang, Zhuhai (CN); Suli Li, Zhuhai (CN)

(73) Assignee: ZHUHAI COSMX BATTERY CO., LTD., Zhuhai (CN)

( * ) Notice: Subject to any disclaimer, the term of this patent is extended or adjusted under 35 U.S.C. 154(b) by 641 days.

(21) Appl. No.: 18/146,032

(22) Filed: Dec. 23, 2022

(65) Prior Publication Data

US 2023/0131127 A1 Apr. 27, 2023

Related U.S. Application Data

(63) Continuation of application No. PCT/CN2021/135477, filed on Dec. 3, 2021.

(30) Foreign Application Priority Data

Dec. 3, 2020 (CN) ......................... 202011396207.7

(51) Int. Cl.

| | |
|---|---|
| ***H01M 10/0567*** | (2010.01) |
| ***H01M 4/36*** | (2006.01) |
| ***H01M 4/38*** | (2006.01) |
| ***H01M 4/583*** | (2010.01) |
| ***H01M 10/0525*** | (2010.01) |
| ***H01M 10/0568*** | (2010.01) |
| ***H01M 10/0569*** | (2010.01) |
| *H01M 4/02* | (2006.01) |

(52) U.S. Cl.

CPC ....... *H01M 10/0567* (2013.01); *H01M 4/364* (2013.01); *H01M 4/386* (2013.01); *H01M 4/583* (2013.01); *H01M 10/0525* (2013.01); *H01M 10/0568* (2013.01); *H01M 10/0569* (2013.01); *H01M 2004/027* (2013.01); *H01M 2300/0028* (2013.01)

(58) Field of Classification Search

CPC ... H01M 4/386; H01M 4/583; H01M 10/0567

See application file for complete search history.

(56) References Cited

U.S. PATENT DOCUMENTS

| | | | | |
|---|---|---|---|---|
| 2009/0226808 A1 | | 9/2009 | Hiwara et al. | |
| 2010/0160689 A1 | | 6/2010 | Ignatyev et al. | |
| 2016/0190646 A1 | * | 6/2016 | Kim | H01M 10/052 429/339 |
| 2019/0296397 A1 | * | 9/2019 | Lim | H01M 10/0568 |
| 2019/0355973 A1 | * | 11/2019 | Hirose | H01M 4/133 |
| 2020/0203772 A1 | | 6/2020 | Moganty et al. | |
| 2022/0231336 A1 | * | 7/2022 | Goto | H01M 10/0568 |

FOREIGN PATENT DOCUMENTS

| | | | | | |
|---|---|---|---|---|---|
| CN | 1290047 A | | 4/2001 | |
| CN | 106532010 A | * | 3/2017 | H01M 4/136 |
| CN | 106946925 A | | 7/2017 | |
| CN | 107565166 A | | 1/2018 | |
| CN | 111640986 A | | 9/2020 | |
| CN | 112467220 A | | 3/2021 | |
| JP | 2000243437 A | | 9/2000 | |
| JP | 2006331866 A | | 12/2006 | |
| JP | 2008027766 A | | 2/2008 | |
| JP | 2012174546 A | | 9/2012 | |
| WO | 2020184690 A1 | | 9/2020 | |
| WO | 2020197278 A1 | | 10/2020 | |

OTHER PUBLICATIONS

Extended European Search Report issued in counterpart European Patent Application No. 21900110.4, dated Oct. 4, 2024.

First Office Action issued in counterpart Chinese Patent Application No. 202011396207.7, dated Sep. 2, 2021.

Fujiki et al., Syntheses and lipophilicities of tetraarylborate ions substituted with many trifluoromethyl groups, Journal of Fluorine Chemistry, 1992, 57(1-3), pp. 307-321, dated Jun. 30, 1992.

International Search Report and Written Opinion issued in corresponding PCT Application No. PCT/CN2021/135477, dated Mar. 2, 2022.

Kolomeitsev, Perfluoroalkyl borates and boronic esters: new promising partners for Suzuki and Petasis reactions, Tetrahedron Letters, 2003, 44(45), pp. 8273-8277, dated Nov. 3, 2003.

* cited by examiner

*Primary Examiner* — Amanda C. Walke

(74) *Attorney, Agent, or Firm* — Westbridge IP LLC

(57) ABSTRACT

Disclosed are an electrolyte suitable for a lithium-ion battery of a silicon-carbon system and a lithium-ion battery. The electrolyte provided in the present disclosure includes an organic solvent, an additive, and a lithium salt, where the additive includes lithium trifluoromethyl triethyl borate, prop-1-ene-1,3-sultone, and fluoroethylene carbonate. The combined use of the additive may significantly prolong the cycle life of a silicon-carbon battery, and enables the silicon-carbon battery to have both high-temperature/low-temperature performance and safety performance, so that the silicon-carbon battery is enabled to be more suitable for large-scale commercial production.

8 Claims, No Drawings

ELECTROLYTE SUITABLE FOR LITHIUM-ION BATTERY OF SILICON-CARBON SYSTEM AND LITHIUM-ION BATTERY

CROSS-REFERENCE TO RELATED APPLICATIONS

The present application is a continuation application of International Application No. PCT/CN2021/135477 filed on Dec. 3, 2021, which claims priority to Chinese Patent Application No. 202011396207.7 filed on Dec. 3, 2020. Both applications are incorporated herein by reference in their entireties.

TECHNICAL FIELD

The present disclosure belongs to the technical field of lithium-ion batteries, and specifically relates to an electrolyte suitable for a lithium-ion battery of a silicon-carbon system.

BACKGROUND

Since commercialization of lithium-ion batteries, the lithium-ion batteries have been widely used in fields such as the digital field, the energy storage field, the power field, the military aerospace field, and the field of communications devices due to high specific energy and good cycling performance. With the wide application of the lithium-ion batteries, consumers constantly improve use environments and demands for the lithium-ion batteries, and have increasingly high requirements for battery lives of electronic devices. This requires the lithium-ion batteries to have relatively high energy density, in addition to high-temperature performance and low-temperature performance.

Silicon-carbon batteries are one of effective means of increasing energy density of batteries. An electrolyte is one of main materials of lithium-ion batteries of a silicon-carbon system, playing a role in transporting $Li^+$ in the lithium-ion batteries of a silicon-carbon system. Therefore, research and development of electrolytes are very important to the lithium-ion batteries of a silicon-carbon system. However, it is difficult to develop an electrolyte that can alleviate big cyclic expansion of a silicon-based negative electrode and that has not only high-temperature performance but also low-temperature performance. At the present stage, usage of an additive in the electrolyte is an efficient weapon to solve the above problem. However, it is usually difficult for a current electrolyte additive to form a strong and flexible Solid Electrolyte Interphase (SEI) film that can withstand damage caused by expansion of a silicon-based negative electrode in a cycling process; and a high-temperature additive leads to relatively large impedance, and low-temperature performance of a battery is seriously affected. Therefore, there is an urgent need to develop an electrolyte suitable for a lithium-ion battery of a silicon-carbon system, which can prolong a cycle life of a silicon-carbon battery and has not only high-temperature performance but also low-temperature performance.

SUMMARY

The present disclosure provides an electrolyte suitable for a lithium-ion battery of a silicon-carbon system. A lithium-ion battery of a silicon-carbon system using the electrolyte may effectively alleviate problems of large battery cycle expansion, short cycle life, and failing to implement both high-temperature performance and low-temperature performance of a battery and the like, thereby significantly improving high-temperature/low-temperature performance and prolonging a cycle life of a lithium-ion battery of a silicon-carbon system. In addition, safety performance of the lithium-ion battery of the silicon-carbon system may also be significantly improved, so that the lithium-ion battery is suitable for large-scale commercial production.

Specifically, the present disclosure provides the following technical solutions.

An electrolyte suitable for a lithium-ion battery of a silicon-carbon system is provided. The electrolyte includes an organic solvent, an additive, and a lithium salt. The additive includes lithium trifluoromethyl triethyl borate, prop-1-ene-1,3-sultone, and fluoroethylene carbonate.

Further, a content of lithium trifluoromethyl triethyl borate accounts for 0.1 wt % to 2 wt % of a total mass of the electrolyte, preferably 0.2 wt % to 1.0 wt %, and more preferably 0.2 wt % to 0.5 wt %, for example, 0.1 wt %, 0.2 wt %, 0.3 wt %, 0.4 wt %, 0.5 wt %, 0.8 wt %, 0.9 wt %, 1 wt %, 1.2 wt %, 1.3 wt %, 1.4 wt %, 1.5 wt %, 1.6 wt %, 1.7 wt %, 1.8 wt %, 1.9 wt %, or 2.0 wt %.

Lithium trifluoromethyl triethyl borate in the present disclosure may be prepared according to a method known in the art, or purchased through a commercial channel.

A structure of lithium trifluoromethyl triethyl borate in the present disclosure is represented by formula 1:

(Formula 1)

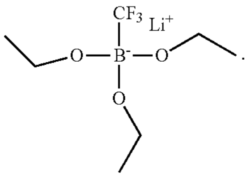

Further, a content of prop-1-ene-1,3-sultone accounts for 0.2 wt % to 3.5 wt % of a total mass of the electrolyte, preferably 0.5 wt % to 2 wt %, for example, 0.2 wt %, 0.3 wt %, 0.4 wt %, 0.5 wt %, 0.8 wt %, 0.9 wt %, 1 wt %, 1.2 wt %, 1.3 wt %, 1.4 wt %, 1.5 wt %, 1.6 wt %, 1.7 wt %, 1.8 wt %, 1.9 wt %, 2.0 wt %, 3.0 wt %, or 3.5 wt %.

Prop-1-ene-1,3-sultone (English name: prop-1-ene-1,3-sultone; and Chemical Abstracts Service (CAS) number: 21806-61-1) in the present disclosure may be prepared according to a method known in the art, or purchased through a commercial channel.

Further, a content of fluoroethylene carbonate accounts for 8 wt % to 20 wt % of a total mass of the electrolyte, for example, 8 wt %, 9 wt %, 10 wt %, 11 wt %, 12 wt %, 13 wt %, 14 wt %, 15 wt %, 16 wt %, 17 wt %, 18 wt %, 19 wt %, or 20 wt %.

Fluoroethylene carbonate (English name: fluoroethylene carbonate; and CAS number: 114435-02-8) in the present disclosure may be prepared according to a method known in the art, or purchased through a commercial channel.

Further, the additive further includes at least one of succinonitrile, adiponitrile, glycerol trinitrile, 1,3,6-hexanetricarbonitrile, and 1,2-bis(cyanoethoxy) ethane, and a content thereof accounts for 0 wt % to 10 wt % of a total mass of the electrolyte, for example, may range from 1 wt % to 5 wt %.

Further, the organic solvent is selected from at least one of a carbonic ester, a carboxylic ester, and a fluoroether, where the carbonic ester is selected from a combination of one or more of ethylene carbonate, propylene carbonate, dimethyl carbonate, ethyl methyl carbonate, diethyl carbonate, and methyl propyl carbonate; the carboxylic ester is selected from a combination of one or both of ethyl propionate and propyl propionate; and the fluoroether is selected from 1,1,2,2-tetrafluoroethyl-2,2,3,3-tetrafluoropropylether.

Further, the lithium salt is selected from one or more of lithium hexafluorophosphate, lithium bisfluorosulfonylimide, or lithium bis(trifluoromethanesulphonyl)imide.

Further, a content of the lithium salt accounts for 10 wt % to 20 wt % of a total mass of the electrolyte, for example, 10 wt %, 11 wt %, 12 wt %, 13 wt %, 14 wt %, 15 wt %, 16 wt %, 17 wt %, 18 wt %, 19 wt %, or 20 wt %.

The present disclosure further provides a method for preparing an electrolyte. The method includes the following step:

mixing an organic solvent, an additive, and a lithium salt, where the additive includes lithium trifluoromethyl triethyl borate, prop-1-ene-1,3-sultone, and fluoroethylene carbonate.

For example, the method includes the following steps:

preparing the organic solvent in a glove box that is filled with argon gas and that has qualified water content and oxygen content; and then quickly adding the fully dried lithium salt, lithium trifluoromethyl triethyl borate, prop-1-ene-1,3-sultone, and fluoroethylene carbonate, to prepare the electrolyte.

The present disclosure further provides a lithium-ion battery. The lithium-ion battery includes the foregoing electrolyte.

Further, the lithium-ion battery is a lithium-ion battery of a silicon-carbon system.

Further, the lithium-ion battery further includes a positive electrode plate, a negative electrode plate, and a separator.

Further, the negative electrode plate includes a negative electrode current collector and a negative electrode active material layer applied to a surface of either or both sides of the negative electrode current collector. The negative electrode active material layer includes a negative electrode active material, and the negative electrode active material is selected from a silicon-carbon negative electrode material composed of nano-silicon and/or $SiO_x$ ($0.8 \leq x \leq 1.3$) and graphite.

Further, one or more of the nano-silicon and $SiO_x$ account for 1 wt % to 55 wt % of a total mass of the silicon-carbon negative electrode material, for example, 1 wt %, 2 wt %, 5 wt %, 8 wt %, 10 wt %, 12 wt %, 15 wt %, 18 wt %, 20 wt %, 25 wt %, 30 wt %, 35 wt %, 40 wt %, 45 wt %, 50 wt %, or 55 wt %.

Further, the negative electrode active material layer further includes a binder, a conductive agent, and a dispersing agent.

Further, the negative electrode active material layer includes components of the following mass percentage: 70 wt % to 99.7 wt % of the negative electrode active material, 0.1 wt % to 10 wt % of the binder, 0.1 wt % to 10 wt % of the dispersing agent, and 0.1 wt % to 10 wt % of the conductive agent.

Preferably, the negative electrode active material layer includes components of the following mass percentage: 76 wt % to 98.5 wt % of the negative electrode active material, 0.5 wt % to 8 wt % of the binder, 0.5 wt % to 8 wt % of the dispersing agent, and 0.5 wt % to 8 wt % of the conductive agent.

Further preferably, the negative electrode active material layer includes components of the following mass percentage: 85 wt % to 98.5 wt % of the negative electrode active material, 0.5 wt % to 5 wt % of the binder, 0.5 wt % to 5 wt % of the dispersing agent, and 0.5 wt % to 5 wt % of the conductive agent.

Further, the binder is selected from at least one of high molecular polymers such as polyvinylidene fluoride (PVDF), polytetrafluoroethylene (PTFE), polyethyleneimine (PEI), polyaniline (PAN), polyacrylic acid (PAA), sodium alginate, styrene-butadiene rubber (SBR), sodium carboxymethyl cellulose (CMC), phenolic resin, or epoxy resin.

Further, the dispersing agent is selected from at least one of polyvinyl alcohol (PVA), cetyl ammonium bromide, sodium dodecyl benzene sulfonate, silane coupling agent, ethanol, N-methyl pyrrolidone (NMP), N,N-dimethyl formamide (DMF), and the like, more preferably, at least one of cetyl ammonium bromide, sodium dodecyl benzene sulfonate, silane coupling agent, and ethanol.

Further, the conductive agent is selected from at least one of carbon nanotubes (CNTs), carbon fibers (VGCF), conductive graphite (KS-6 and SFG-6), mesocarbon microbeads (MCMB), graphene, Ketjen black, Super P, acetylene black, conductive carbon black, or hard carbon.

Further, the positive electrode plate includes a positive electrode current collector and a positive electrode active material layer applied to a surface of either or both sides of the positive electrode current collector. The positive electrode active material layer includes a positive electrode active material, and the positive electrode active material is selected from one or more of $LiCoO_2$, $LiNiO_2$, $LiMn_2O_4$, $LiFePO_4$, and $Li_xNi_yM_{1-y}O_2$, where $0.9 \leq x \leq 1.2$, $0.5 \leq y < 1$, and M is selected from one or more of Co, Mn, Al, Mg, Ti, Zr, Fe, Cr, Mo, Cu, and Ca.

Further, the positive electrode active material layer further includes a binder and a conductive agent.

Further, the positive electrode active material layer includes components of the following mass percentage: 80 wt % to 99.8 wt % of the positive electrode active material, 0.1 wt % to 10 wt % of the binder, and 0.1 wt % to 10 wt % of the conductive agent.

Preferably, the positive electrode active material layer includes components of the following mass percentage: 84 wt % to 99 wt % of the positive electrode active material, 0.5 wt % to 8 wt % of the binder, and 0.5 wt % to 8 wt % of the conductive agent.

Further preferably, the positive electrode active material layer includes components of the following mass percentage: 90 wt % to 99 wt % of the positive electrode active material, 0.5 wt % to 5 wt % of the binder, and 0.5 wt % to 5 wt % of the conductive agent.

Further, the binder is selected from at least one of high molecular polymers such as polyvinylidene fluoride (PVDF), polytetrafluoroethylene (PTFE), polyethyleneimine (PEI), polyaniline (PAN), polyacrylic acid (PAA), sodium alginate, styrene-butadiene rubber (SBR), sodium carboxymethyl cellulose (CMC), phenolic resin, or epoxy resin.

Further, the conductive agent is selected from at least one of carbon nanotubes (CNTs), carbon fibers (VGCF), conductive graphite (KS-6 and SFG-6), mesocarbon microbeads (MCMB), graphene, Ketjen black, Super P, acetylene black, conductive carbon black, or hard carbon.

Further, the separator is a separator known in the art, such as a polyethylene separator, a polypropylene separator, or the like.

The present disclosure further provides a method for preparing the foregoing lithium-ion battery. The method includes the following steps:

(1) preparing a positive electrode plate and a negative electrode plate, where the positive electrode plate includes a positive electrode active material, and the negative electrode plate includes a negative electrode active material;

(2) mixing an organic solvent, an additive, and a lithium salt to prepare an electrolyte; and (3) winding the positive electrode plate, a separator, and the negative electrode plate to obtain a bare cell that has not undergone injection; placing the bare cell into outer package foil; and injecting the electrolyte obtained in step (2) into the bare cell that is dried, to prepare the lithium-ion battery.

For example, the method specifically includes the following steps.

(1) Preparation of a Positive Electrode Plate

Mixing the positive electrode active material $LiCoO_2$, the binder polyvinylidene fluoride (PVDF), and the conductive agent acetylene black in a weight ratio of 96.5:2:1.5; adding N-methyl pyrrolidone (NMP) and stirring the mixture under the action of a vacuum blender until a mixed system becomes positive electrode slurry with uniform fluidity; uniformly applying the positive electrode slurry to aluminum foil with a thickness ranging from 9 μm to 12 μm; baking the foregoing well coated aluminum foil in an oven with five different temperature gradients; and drying the aluminum foil in the oven at 120° C. for 8 hours, followed by rolling and slitting, to obtain a required positive electrode plate.

(2) Preparation of a Silicon-Carbon Negative Electrode Plate

Preparing negative electrode slurry according to a wet process from a silicon-carbon negative electrode material (composed of SiO and graphite, where a mass percentage of SiO is 3%) with a mass percentage of 95.9%, a conductive agent single-walled carbon nanotubes (SWCNT) with a mass percentage of 0.1%, a conductive agent conductive carbon black (SP) with a mass percentage of 1%, a dispersing agent sodium carboxymethyl cellulose (CMC) with a mass percentage of 1%, and a binder styrene-butadiene rubber (SBR) with a mass percentage of 2%; uniformly applying the negative electrode slurry to copper foil with a thickness ranging from 9 μm to 12 μm; baking the foregoing well coated copper foil in an oven with five different temperature gradients; and drying the copper foil in the oven at 85° C. for 5 hours, followed by rolling and slitting, to obtain a required silicon-carbon negative electrode plate.

(3) Preparation of an Electrolyte

Uniformly mixing ethylene carbonate, propylene carbonate, propyl propionate, and ethyl propionate in a mass ratio of 1:2:5:2 (a solvent needs to be normalized) in a glove box that is filled with argon gas and that has qualified water content and oxygen content; and quickly adding 1 mol/L (12.5 wt %) of fully dried lithium hexafluorophosphate ($LiPF_6$) and an additive (including lithium trifluoromethyl triethyl borate, prop-1-ene-1,3-sultone, and fluoroethylene carbonate), to obtain the electrolyte.

(4) Preparation of a Separator

Using a polyethylene separator with a thickness ranging from 7 μm to 9 μm.

(5) Preparation of a Lithium-Ion Battery

Winding the positive electrode plate, the separator, and the negative electrode plate prepared above to obtain a bare cell that has not undergone injection; placing the bare cell into outer package foil; and injecting the prepared electrolyte into the dried bare cell, followed by processes such as vacuum packaging, standing, formation, shaping, and sorting, to obtain a required lithium-ion battery.

Beneficial effects of the present disclosure are as follows:

In the electrolyte provided in the present disclosure, because fluoroethylene carbonate and lithium trifluoromethyl triethyl borate are combined, a tough and low-impedance SEI composite film may be formed on a surface of a silicon-carbon negative electrode, which significantly inhibits cyclic expansion of a silicon-carbon negative electrode material, and may prolong a cycle life of a battery. In addition, lithium ions are enabled to reversibly deintercalate/intercalate more easily, thereby improving low-temperature performance of the battery. Because prop-1-ene-1,3-sultone and lithium trifluoromethyl triethyl borate are combined, a stronger composite protective film may be formed on surfaces of a positive electrode and a negative electrode, which effectively improves high-temperature performance and safety performance of the battery. Because the three additives are combined in the present disclosure, a synergistic effect thereof may significantly prolong a cycle life of a silicon-carbon battery, and enables the battery to have both high-temperature/low-temperature performance and safety performance.

DETAILED DESCRIPTIONS OF THE EMBODIMENTS

The following further describes the present disclosure in detail with reference to specific embodiments. It should be understood that the following examples are only intended to illustrate and explain the present disclosure, and shall not be construed as a limitation on the protection scope of the present disclosure. All technologies implemented based on the foregoing content of the present disclosure shall fall within the intended protection scope of the present disclosure.

Experimental methods used in the following examples are conventional methods unless otherwise specified. Reagents, materials, and the like that are used in the following examples may be all obtained from commercial sources unless otherwise specified.

Comparative Examples 1 to 6 and Examples 1 to 8

Lithium-ion batteries in Comparative Examples 1 to 6 and Examples 1 to 8 were all prepared according to the following preparation method, and the difference lies in selection and addition amounts of components in an electrolyte. For specific differences, refer to Table 1.

(1) Preparation of a Positive Electrode Plate

Mixing a positive electrode active material $LiCoO_2$, a binder polyvinylidene fluoride (PVDF), and a conductive agent acetylene black in a weight ratio of 96.5:2:1.5; adding N-methyl pyrrolidone (NMP) and stirring the mixture under the action of a vacuum blender until a mixed system becomes positive electrode slurry with uniform fluidity; uniformly applying the positive electrode slurry to aluminum foil with a thickness ranging from 9 μm to 12 μm; baking the foregoing well coated aluminum foil in an oven with five different temperature gradients; and drying the aluminum foil in the oven at 120° C. for 8 hours, followed by rolling and slitting, to obtain a required positive electrode plate.

(2) Preparation of a Silicon-Carbon Negative Electrode Plate

Preparing negative electrode slurry according to a wet process from a silicon-carbon negative electrode material (composed of SiO and graphite, where a mass percentage of SiO is 3%) with a mass percentage of 95.9%, a conductive agent single-walled carbon nanotubes (SWCNT) with a mass percentage of 0.1%, a conductive agent conductive carbon black (SP) with a mass percentage of 1%, a dispersing agent sodium carboxymethyl cellulose (CMC) with a mass percentage of 1%, and a binder styrene-butadiene rubber (SBR) with a mass percentage of 2%; uniformly applying the negative electrode slurry to copper foil with a thickness ranging from 9 μm to 12 μm; baking the foregoing well coated copper foil in an oven with five different temperature gradients; and drying the copper foil in the oven at 85° C. for 5 hours, followed by rolling and slitting, to obtain a required silicon-carbon negative electrode plate.

(3) Preparation of an Electrolyte

Uniformly mixing ethylene carbonate, propylene carbonate, propyl propionate, and ethyl propionate in a mass ratio of 1:2:5:2 (the solvent needs to be normalized) in a glove box that is filled with argon gas and that has qualified water content and oxygen content; and quickly adding 1 mol/L (12.5 wt %) of fully dried lithium hexafluorophosphate ($LiPF_6$), 3 wt % of mass percentage of 1,3,6-hexanetricarbonitrile, and other additive (including lithium trifluoromethyl triethyl borate, prop-1-ene-1,3-sultone, and fluoroethylene carbonate, where for specific content and selection, refer to Table 1) to the mixture, to obtain the electrolyte.

(4) Preparation of a Separator

Using a polyethylene separator with a thickness ranging from 7 μm to 9 μm.

(5) Preparation of a Lithium-Ion Battery

Winding the positive electrode plate, the separator, and the negative electrode plate prepared above to obtain a bare cell that has not undergone injection; placing the bare cell into outer package foil; and injecting the prepared electrolyte into the dried bare cell, followed by processes such as vacuum packaging, standing, formation, shaping, and sorting, to obtain a required lithium-ion battery.

TABLE 1

Composition and adding amounts of other additives in the electrolyte in step (3) in Comparative Examples 1 to 6 and Examples 1 to 8

| Item | Adding amount of lithium trifluoromethyl triethyl borate (wt %) | Adding amount of prop-1-ene-1,3-sultone (wt %) | Adding amount of fluoroethylene carbonate (wt %) |
|---|---|---|---|
| Comparative Example 1 | 0.5 | / | / |
| Comparative Example 2 | / | 0.5 | / |
| Comparative Example 3 | / | / | 8.0 |
| Comparative Example 4 | 0.5 | 0.5 | / |
| Comparative Example 5 | 0.5 | / | 8.0 |
| Comparative Example 6 | / | 0.5 | 8.0 |
| Example 1 | 0.5 | 0.5 | 8.0 |
| Example 2 | 0.1 | 2.0 | 10.0 |
| Example 3 | 1.0 | 1.5 | 12.0 |
| Example 4 | 1.5 | 2.5 | 15.0 |
| Example 5 | 2.0 | 0.2 | 9.0 |
| Example 6 | 0.8 | 3.5 | 18.0 |
| Example 7 | 1.2 | 3.0 | 20.0 |
| Example 8 | 1.4 | 2.8 | 14.0 |

Electrochemical performance of batteries obtained in the foregoing comparative examples and examples was tested, and related descriptions are as follows:

(1) 45° C. Cyclic Experiment:

The batteries obtained in the foregoing examples and comparative examples were placed in an environment of (45±2° C.), followed by standing for 2-3 hours; when battery bodies reached (45±2° C.), the batteries underwent 1 C constant-current charge with a cut-off current of 0.05 C until the batteries were fully charged, followed by standing for 5 minutes; and then the batteries underwent 0.7 C constant-current discharge with a cut-off voltage of 3.0 V, where the highest discharge capacity of the first three cycles was recorded as an initial capacity Q, an initial thickness T of each battery cell was recorded, and when the cycles reached a required quantity of times, a discharge capacity $Q_1$ and a battery thickness $T_1$ of each battery in the last cycle were recorded. The recorded results are shown in Table 2.

The following calculation formulas were used:

$$\text{Capacity retention (\%)}=Q_1/Q\times 100\%;\text{ and}$$

$$\text{Thickness change rate (\%)}=(T_1-T)/T\times 100\%.$$

(2) Experiment with 10-Hour High-Temperature Storage at 85° C.:

The batteries obtained in the foregoing examples and comparative examples were placed at room temperature to perform three times of charge/discharge cycle tests at a charge/discharge rate of 0.5 C, and then charged at a rate of 0.5 C to a fully charged state, where the highest discharge capacity $Q_2$ and a battery thickness $T_2$ of each battery in the first three 0.5 C cycles were recorded respectively. The batteries were stored at 85° C. for 10 hours after being fully charged, and after the 10 hours, a battery thickness $T_3$ and a 0.5 C discharge capacity $Q_3$ were recorded. Experimental data, such as thickness change rate and capacity retention of the batteries stored at high temperature, were calculated, where recorded results are shown in Table 2.

The following calculation formulas were used:

$$\text{Capacity retention (\%)}=Q_3/Q_2\times 100\%;\text{ and}$$

$$\text{Thickness change rate (\%)}=(T_3-T_2)/T_2\times 100\%.$$

(3) 130° C. Thermal Shock Experiment:

The batteries obtained in the foregoing examples and comparative examples were heated according to a convection method or by using a circulating hot air box at an initial temperature of (25±3° C.) with a temperature change rate of (5±2° C.)/min; and when the temperature was raised to (130±2° C.), the experiment was ended after the temperature had been kept for 60 minutes. The state results of the batteries were recorded as in Table 2.

(4) Low-Temperature Discharge Experiment:

The batteries obtained in the foregoing examples and comparative examples were placed in an environment with a temperature of (25±3)° C. to first discharge to 3.0 V at 0.2 C, and then charged at 0.7 C after standing for 5 minutes; when a cell terminal voltage reached a limited charge voltage, charging was performed at a constant voltage; the charging was stopped when a charge current become less than or equal to a cut-off current, followed by standing for 5 minutes; the batteries were discharged to 3.0 V at 0.2 C; and a discharge capacity in this time was recorded as a room-temperature capacity $Q_4$. Then, the cell is charged at 0.7 C; when the cell terminal voltage reached the limited charge voltage, charging was performed at a constant voltage; the charging was stopped when the charge current become less than or equal to the cut-off current; the fully charged batteries left to stand for 4 hours at (−10±2° C.), and were discharged with a current of 0.4 C to the cut-off voltage of 3.0V; and a discharge capacity $Q_5$ was recorded. A low-temperature discharge capacity retention may be calculated, and recorded results are shown in Table 2.

The following calculation formula was used:

$$\text{Low-temperature discharge capacity retention }(\%)=Q_5/Q_4\times100\%.$$

TABLE 2

Performance test results of Comparative Examples 1 to 6 and Examples 1 to 8

| Item | 500 cycles for 1 C at 45° C. Capacity retention % | 500 cycles for 1 C at 45° C. Thickness change rate % | 10-hour high-temperature storage at 85° C. Capacity retention % | 10-hour high-temperature storage at 85° C. Thickness change rate % | 130° C. thermal shock for 60 minutes Fire (passes/tests) | 130° C. thermal shock for 60 minutes Explosion (passes/tests) | Capacity retention of 0.4 C discharge at −10° C. |
|---|---|---|---|---|---|---|---|
| Comparative Example 1 | 55.45% | 28.4% | 62.44% | 23.9% | 0/5 | 0/5 | 79.41% |
| Comparative Example 2 | 57.71% | 23.1% | 68.29% | 16.7% | 2/5 | 2/5 | 61.06% |
| Comparative Example 3 | 65.47% | 13.5% | 53.45% | 29.5% | 1/5 | 1/5 | 63.49% |
| Comparative Example 4 | 60.14% | 19.4% | 70.83% | 15.5% | 2/5 | 2/5 | 68.34% |
| Comparative Example 5 | 67.12% | 13.2% | 55.39% | 24.7% | 0/5 | 0/5 | 66.15% |
| Comparative Example 6 | 68.39% | 12.2% | 69.38% | 15.0% | 3/5 | 4/5 | 57.86% |
| Example 1 | 73.62% | 10.8% | 74.32% | 9.8% | 5/5 | 5/5 | 74.94% |
| Example 2 | 74.34% | 9.6% | 77.49% | 8.3% | 5/5 | 5/5 | 71.34% |
| Example 3 | 75.10% | 9.0% | 75.10% | 9.3% | 5/5 | 5/5 | 74.56% |
| Example 4 | 77.62% | 8.5% | 79.18% | 7.5% | 5/5 | 5/5 | 76.71% |
| Example 5 | 73.54% | 10.3% | 70.31% | 12.9% | 5/5 | 5/5 | 79.89% |
| Example 6 | 80.40% | 7.5% | 80.21% | 5.9% | 5/5 | 5/5 | 75.19% |
| Example 7 | 82.58% | 8.5% | 79.36% | 6.8% | 5/5 | 5/5 | 77.12% |
| Example 8 | 75.38% | 10.5% | 77.48% | 7.3% | 5/5 | 5/5 | 78.33% |

The following can be learned from the results in Table 2.

In summary, the electrolyte suitable for a lithium-ion battery of a silicon-carbon system provided in the present disclosure contains an additive combination of lithium trifluoromethyl triethyl borate, prop-1-ene-1,3-sultone, and fluoroethylene carbonate. Due to a synergistic effect of the additives, a lithium-ion battery of a silicon-carbon system is enabled to have not only excellent high-temperature cycling performance, high-temperature storage performance, and low-temperature discharge performance, but also high safety performance.

The foregoing illustrates implementation of the present disclosure. However, the present disclosure is not limited to the foregoing implementation. Any modifications, equivalent replacements, improvements, or the like made without departing from the spirit and principle of the present disclosure shall fall within the protection scope of the present disclosure.

What is claimed is:

1. An electrolyte suitable for a lithium-ion battery of a silicon-carbon system, comprising an organic solvent, an additive, and a lithium salt, wherein the additive comprises lithium trifluoromethyl triethyl borate, prop-1-ene-1,3-sultone, and fluoroethylene carbonate; a content of lithium trifluoromethyl triethyl borate accounts for 0.8 wt % to 2 wt % of a total mass of the electrolyte, a content of prop-1-ene-1,3-sultone accounts for 0.8 wt % to 3.5 wt % of a total mass of the electrolyte, and a content of fluoroethylene carbonate accounts for 9 wt % to 20 wt % of a total mass of the electrolyte; and the additive further comprises at least one of succinonitrile, glycerol trinitrile, 1,3,6-hexanetricarbonitrile, and 1,2-bis(cyanoethoxy) ethane, and a content thereof accounts for 1 wt % to 5 wt % of a total mass of the electrolyte.

2. The electrolyte according to claim 1, wherein the organic solvent is selected from at least one of a carbonic ester, a carboxylic ester, and a fluoroether.

3. The electrolyte according to claim 2, wherein the carbonic ester is selected from a combination of one or more of ethylene carbonate, propylene carbonate, dimethyl carbonate, ethyl methyl carbonate, diethyl carbonate, and methyl propyl carbonate.

4. The electrolyte according to claim 2, wherein the carboxylic ester is selected from a combination of one or both of ethyl propionate and propyl propionate.

5. The electrolyte according to claim 2, wherein the fluoroether is selected from 1,1,2,2-tetrafluoroethyl-2,2,3,3-tetrafluoropropylether.

6. The electrolyte according to claim 1, wherein the lithium salt is selected from one or more of lithium hexafluorophosphate, lithium bisfluorosulfonylimide, or lithium bis(trifluoromethanesulphonyl)imide.

7. The electrolyte according to claim 6, wherein a content of the lithium salt accounts for 10 wt % to 20 wt % of a total mass of the electrolyte.

8. A lithium-ion battery, comprising an electrolyte, wherein the electrolyte comprises an organic solvent, an additive, and a lithium salt, and the additive comprises lithium trifluoromethyl triethyl borate, prop-1-ene-1,3-sultone, and fluoroethylene carbonate; a content of lithium trifluoromethyl triethyl borate accounts for 0.8 wt % to 2 wt % of a total mass of the electrolyte, a content of prop-1-ene-1,3-sultone accounts for 0.8 wt % to 3.5 wt % of a total mass of the electrolyte, and a content of fluoroethylene carbonate accounts for 9 wt % to 20 wt % of a total mass of the electrolyte; the additive further comprises at least one of succinonitrile, glycerol trinitrile, 1,3,6-hexanetricarbonitrile, and 1,2-bis(cyanoethoxy) ethane, and a content thereof accounts for 1 wt % to 5 wt % of a total mass of the electrolyte; and the lithium-ion battery further comprises a negative electrode plate, the negative electrode plate comprises a negative electrode active material layer, the negative electrode active material layer comprises a negative electrode active material, and the negative electrode active material is selected from a silicon-carbon negative electrode material composed of nano-silicon and/or $SiO_x$ ($0.8 \le x \le 1.3$) and graphite; and one or more of the nano-silicon and $SiO_x$ account for 1 wt % to 55 wt % of a total mass of the silicon-carbon negative electrode material.

* * * * *